United States Patent
Chretiennot et al.

(10) Patent No.: US 10,777,871 B2
(45) Date of Patent: Sep. 15, 2020

(54) DEVICE FOR EXPOSING AT LEAST ONE OBJECT TO AN ELECTROMAGNETIC FIELD HAVING A LOW INPUT REFLECTION COEFFICIENT

(71) Applicant: COMMISSARIAT A L'ENERGIE ATOMIQUE ET AUX ENERGIES ALTERNATIVES, Paris (FR)

(72) Inventors: Thomas Chretiennot, Chaumont (FR); Rene Vezinet, Bio (FR); Alexandre Catrain, Le Vigan (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/563,319

(22) PCT Filed: Mar. 30, 2016

(86) PCT No.: PCT/EP2016/056938
§ 371 (c)(1),
(2) Date: Sep. 29, 2017

(87) PCT Pub. No.: WO2016/156412
PCT Pub. Date: Oct. 6, 2016

(65) Prior Publication Data
US 2018/0076502 A1  Mar. 15, 2018

(30) Foreign Application Priority Data
Mar. 30, 2015 (FR) .................. 15 52670

(51) Int. Cl.
*H01P 5/08* (2006.01)
*G01N 22/00* (2006.01)
*H01P 3/02* (2006.01)

(52) U.S. Cl.
CPC ............ *H01P 5/08* (2013.01); *G01N 22/00* (2013.01); *H01P 3/02* (2013.01)

(58) Field of Classification Search
CPC ............ H01P 5/08; H01P 3/02; G01N 22/00
See application file for complete search history.

(56) References Cited

U.S. PATENT DOCUMENTS

| 3,501,692 A | 3/1970 | Kluck |
| 4,259,561 A | 3/1981 | Roussy et al. |

(Continued)

OTHER PUBLICATIONS

International Search Report and Written Opinion dated Jun. 15, 2016 in PCT/EP2016/056938 (with English language translation).

(Continued)

*Primary Examiner* — Stephen E. Jones
*Assistant Examiner* — Samuel S Outten
(74) *Attorney, Agent, or Firm* — Oblon, McClelland, Maier & Neustadt, L.L.P.

(57) ABSTRACT

An exposure device for exposing at least one object to an electromagnetic field, including a section of a waveguide or transmission line device including a guided electromagnetic wave, extending along a longitudinal axis, and including a hollow tubular electrical conductor inside which the electric field is established or plural electrical conductors between which the electric field is established. The device further includes a heterogeneous adaptation structure in mechanical contact with the electrical conductor or conductors, at least one extension element, and at least one housing for the object, contained in or positioned next to the extension element. The extension element is made from a material having a relative dielectric permittivity as close as possible to that of each object. The heterogeneous adaptation structure has a dimension, along the longitudinal axis, equal to a non-zero multiple of half-wavelengths of the electromagnetic wave to be propagated in the exposure device.

16 Claims, 7 Drawing Sheets

(56) References Cited

U.S. PATENT DOCUMENTS

| | | | |
|---|---|---|---|
| 6,377,142 B1* | 4/2002 | Chiu | H01P 1/181 333/161 |
| 2002/0156588 A1 | 10/2002 | Arndt et al. | |
| 2004/0155726 A1* | 8/2004 | Hesselbom | H01P 3/081 333/116 |

OTHER PUBLICATIONS

French Preliminary Search Report dated Mar. 3, 2016 in Patent Application No. 1552670 (with English language translation of categories of cited documents).
L.L. Chen, et al., "Planar-circuit Methods", Microwave Electronics: Measurement and Materials Characterization, XP055254800, Jan. 2005, pp. 288-322.
Ainhoa G. Gorriti, et al., "A New Tool for Accurate S-Parameters Measurements and Permittivity Reconstruction", IEEE Transactions on Geoscience and Remote Sensing, vol. 43, No. 8, XP011136770, Aug. 2005, pp. 1727-1735.
A. Paffi, et al., "Exposure Systems for Bioelectromagnetic Investigations in the Radiofrequency Range: Classification and Emerging Trends", Proceedings of EuCAP 2011, pp. 3159-3163.
A. Paffi, et al., "Review of Radiofrequency Exposure Systems for in vitro Biological Experiments", Proceedings of EuCAP 2010, Barcelona, Apr. 12-16, 2010, 4 pages.
Alessandra Paffi, et al., "Considerations for Developing an RF Exposure System: A Review for in vitro Biological Experiments", IEEE Transactions on Microwave Theory and Techniques, vol. 58, No. 10, Oct. 2010, pp. 2702-2714.
Niels Kuster, et al., "Recommended Minimal Requirements and Development Guidelines for Exposure Setups of Bio-Experiments Addressing the Health Risk Concern of Wireless Communications", Bioelectromagnetics, vol. 21, 2000, pp. 508-514.
Micaela Liberti, et al., "A Coplanar-Waveguide System for Cells Exposure During Electrophysiological Recordings", IEEE Transactions on Microwave Theory and Techniques, vol. 52, No. 11, Nov. 2004, pp. 2521-2528.
J. X. Zhao, et al., "Dosimetry and Temperature Evaluations of a 1800 MHz TEM Cell for In Vitro Exposure With Standing Waves", Progress In Electromagnetics Research, vol. 124, 2012, pp. 487-510.
C. Iftode, et al., "Design and Validation of a TEM Cell Used for Radiofrequency Dosimetric Studies", Progress in Electromagnetics Research, vol. 132, 2012, pp. 369-388.
Sophie Kohler, et al., "Characterization of a TEM cell-based setup for the exposure of biological cell suspensions to high-intensity nanosecond pulsed electric fields (nsPEFs)", IEEE, 2012, 3 pages.
Yu-Hsuan Wu, et al., "Moveable Wire Electrode Microchamber for Nanosecond Pulsed Electric-Field Delivery", IEEE Transactions on Biomedical Engineering, vol. 60, No. 2, Feb. 2013, pp. 489-496.
P. Krishnaswamy, et al., "Compact High Voltage Subnanosecond Pulsed Power Delivery System for Biological Applications", 16th IEEE International Conference on Pulsed Power, 2007, pp. 476-480.
U.S. Appl. No. 15/312,867, filed Nov. 21, 2016, US-2017-0184648-A1, Rene Vezinet, et al.

* cited by examiner

DEVICE FOR EXPOSING AT LEAST ONE OBJECT TO AN ELECTROMAGNETIC FIELD HAVING A LOW INPUT REFLECTION COEFFICIENT

TECHNICAL FIELD

The present invention relates to the study of the effect of an electromagnetic field in the radio and microwave frequency domains on objects in particular biological or chemical objects to be tested. The real part of the relative dielectric permittivity of such objects is high, greater than 20, or even very high, often greater than 50, in the radiofrequency and microwave frequency ranges. In the following, this real part of the relative dielectric permittivity is called real relative dielectric permittivity.

These studies have led to the development of devices for exposing various objects such as chemical or biological organisms with various sizes and nature, ranging from the molecule or the cell in aqueous solution, to more entire organisms (plants, tissues, particular organs, entire small animals) to an electromagnetic field.

These studies can have a normative purpose in bioelectromagnetism relating to the determination of danger and safety thresholds of the electromagnetic fields from continuous or pulsating waves (telephony, transmission, defence electromagnetic applications, electrical apparatuses, etc.), a medical purpose (cancer treatment, neuronal stimulation, reversible/irreversible electroporation thresholds of some cells, etc.) or even an industrial purpose (decontamination, sterilization, food transformation processes, chemical reaction catalysis, selective removal of some bacteria, etc.).

State of Prior Art

Up to date, several techniques exist for exposing an object to an electromagnetic field.

The most common ones use TEM cells in which the object is placed in an enclosure which protects it from the external environment and is exposed to an electromagnetic transverse TEM-type grazing incidence electromagnetic wave.

The rectangular waveguides and wire patch cells (WPC) are also commonly used.

Other techniques have also been developed, less frequently, they use strip-line-type transmission lines, two-wire or two-plate lines, coplanar lines or coaxial lines.

Documents [2] to [4] the references of which are set out at the end of the description introduce a synthesis of the electromagnetic field exposure devices for bioelectromagnetic applications. Document [12] relates to a coaxial structure.

These waveguides or transmission lines have to be connected at the input thereof to an electromagnetic wave source, the object under test being located on the propagation path of the electromagnetic waves. The electromagnetic field exposure device can be compatible with a simultaneous observation of the object by a microscope as in document [11].

It is attempted to control the electromagnetic field levels and wave forms at the object under test. Document [4] and document [5] the references of which are set out at the end of the description discuss this problem. In Patent document [1] filed on 28 May 2014, it has been suggested to associate the object with an extension element in order to improve the coupling factor and the homogeneity of the field in the object.

The quality of an electromagnetic field exposure device is generally evaluated in terms of coupling rate of the electric field in the object to be tested and in terms of homogeneity of the electric field and/or the specific absorption rate (SAR) inside said object.

But two electrical parameters have also their importance to assess an electromagnetic field exposure device, they are the coefficient S11 (input reflection coefficient when the output is matched) which quantizes the input matching of the device and the coefficient S21 (direct transmission coefficient when the output is matched) which quantizes the insertion losses. It is attempted, to facilitate measurements, to design electromagnetic field exposure devices having a proper matching, that is having the smallest possible input reflection coefficient S11, for example lower than −10 dB and, having a minimum of insertion losses, that is having a direct transmission coefficient S21 close to 0 dB. For example, if there is a strong input mismatching (S11 higher than −5 dB), it will be necessary to overestimate the power of the electromagnetic wave injected at the input of the exposure device with respect to a properly matched exposure device, so as to reach the desired electric field level in the object under test.

It is noticed that by placing the object under test in the exposure device without particular precaution, it is very difficult at once to obtain a high coupling rate, a proper input matching and low insertion losses.

To promote the coupling of the electric field in the object under test, the object under test is contacted with a hollow electrical conductor in which the electric field of the electromagnetic field exposure device is established (case of the waveguide) or with several electrical conductors between which the electric field is established (case of transmission lines). For example, if the object is positioned inside a rectangular waveguide, it is arranged such that it is in contact with the walls of the waveguide between which the electric field is established.

The coupling rate of the electric field in the object is thereby very good but the object induces a strong input mismatching and leads to the occurrence of a strong-amplitude reflected wave. The amplitude of the wave actually propagated in the object is thereby low, or even very low. To ensure a suitable electric field level in the object, it is mandatory to oversize the power of the electromagnetic wave source. This is not satisfactory, because, on one hand, the electromagnetic wave sources on the market have a limited power and on the other hand, not all these sources operate in the presence of a strong-amplitude reflected wave.

In order to minimize mismatch, another approach consists in reducing the volume of the object under test in the electromagnetic field exposure device. In the case of a two-wire line, it is thereby no longer in contact with both conductors of the two-wire line. This enables the input matching to be improved, but this drastically degrades the coupling rate of the electric field in the object, because of the presence of an air layer having a very low real relative dielectric permittivity ($\varepsilon' \approx 1$) between the object with a strong real relative dielectric permittivity ($\varepsilon' > 20$) and one of the walls. For example, if the thickness of this air layer only accounts for 1% of the distance between both conductors of the two-wire line between which the electric field is established, the coupling rate of the electric field in the object can, depending on the dimensions of the two-wire line, drop greatly, with respect to the configuration in which the object under test is in contact with both conductors of the two-wire line.

One compromise between both approaches is often retained intentionally or not as set out in documents [6]-[10]. This compromise is often imposed by the nature of the object under test, (for example solutions of suspended cells, or adhering to the surface of a container), the volumes involved (several nanolitres to several centilitres solutions), the dimensions and shape of the containers (Petri dishes, Eppendorf (trademark from the eponymous company)-type microtubes), or by the type of electromagnetic field exposure device.

For example, a sample in a Petri dish laid flat on the septum of a TEM cell will not have a proper coupling rate of the electric field because the dish is very flat, its height is very low with respect to the distance between the septum and the mass of the TEM cell.

DISCLOSURE OF THE INVENTION

The present invention has precisely the purpose to provide an exposure device for exposing at least one object to an electromagnetic field which does not have the above-mentioned drawbacks.

The present invention provides an exposure device for exposing at least one object to an electromagnetic field which ensures a maximum coupling of the electric field in the object while enabling it to operate with proper electric properties, that is the smallest possible input reflection coefficient and a direct transmission coefficient as close as possible to 0 dB.

Another purpose of the invention is to provide an exposure device for exposing at least one object under test to an electromagnetic field, which enables the homogeneity of the electric field in the object to be improved.

To achieve that end, the present invention provides an exposure device for exposing at least one object to an electromagnetic field, formed by a guided electromagnetic wave device section of a waveguide or transmission line-type, wherein the electromagnetic wave will propagate, extending along a longitudinal axis which is the axis of propagation of the electromagnetic wave, and having a hollow tubular electrical conductor inside which the electric field is established or several electrical conductors between which the electric field is established. The electromagnetic field exposure device is further formed by a heterogeneous matching structure in mechanical contact with the electrical conductor(s). The heterogeneous matching structure includes at least one extension element and at least one housing for accommodating the or each object, this housing being contained in or juxtaposed to the extension element, which is made from a material having a relative dielectric permittivity as close as possible to that of the object or each object. The heterogeneous matching structure has a dimension, along the longitudinal axis, equal to a non-zero multiple of half-wavelengths of the electromagnetic wave to be propagated in the electromagnetic field exposure device.

It is preferable that the material of the extension element has an equivalent electrical conductivity as close as possible to that of the object or each object.

In one embodiment, the electromagnetic field exposure device can be formed by a two-wire line section having two parallel conductors, the heterogeneous matching structure extending longitudinally between both conductors and including an extension element of dielectric material and a housing juxtaposed to the extension element.

In another embodiment, the electromagnetic field exposure device can be formed by a triplate line section with a centre conductor placed between two conductors facing each other, a space being provided between each of the conductors facing each other and the centre conductor, the heterogeneous matching structure being subdivided into two half-structures, each of the half-structures being placed in one of the spaces.

In yet another embodiment, the electromagnetic field exposure device can be formed by a transmission line section including a substrate of dielectric material, the heterogeneous matching structure being housed in a cavity of the substrate or in a through hole of the substrate.

In an additional embodiment, the electromagnetic field exposure device can be formed by a line section coaxial with a centre conductor and an outer conductor surrounding the centre conductor and the dielectric material between the centre conductor and the outer conductor, the heterogeneous matching structure being in the place of a dielectric material section separating the centre conductor and the outer conductor of the coaxial line. The coaxial transmission line section can have a tubular outer conductor and a centre conductor being split into two connectable segments.

In another additional embodiment, the electromagnetic field exposure device can be formed by a coplanar line section having three parallel conductors, the heterogeneous matching structure being subdivided into two heterogeneous matching half-structures each extending longitudinally between two different conductors and each including an extension element of dielectric material and one or more housings cooperating with the extension element.

When there are several housings, they can be located along the heterogeneous matching structure in multiple positions of the half-wavelength of the electromagnetic wave to be propagated in the electromagnetic field exposure device.

In a further embodiment, the heterogeneous matching structure can include a housing which is, on one side, adjoining the extension element and on the other side, is bordered by a plugging element of dielectric material, this plugging element being bordered opposite the housing by a dielectric material, this plugging element being excluded from the heterogeneous matching structure insofar as it is made from a material having a relative dielectric permittivity as close as possible to that of the dielectric material that borders it.

It is contemplatable that a housing is placed between two segments of the extension element.

Alternatively, a housing can be incorporated in the extension element.

In another embodiment, a housing can be subdivided into several compartments, each having to accommodate an object.

In another further embodiment, the electromagnetic field exposure device can be formed by a waveguide, the heterogeneous matching structure fitting the internal shape of the waveguide.

The waveguide section can be split into two connectable segments.

In an alternative which enables the object to be exposed to the electromagnetic field and to be simultaneously observed under a microscope, it is possible that the electromagnetic field exposure device includes a removable part comprising a first transmission line section provided with the heterogeneous matching structure and an accommodating part, including a second and a third transmission line sections, for being placed on a microscope stage, in a working position, the first transmission line section being connected, on one side, to the second transmission line section, and on the other to the other side, to the third transmission line section.

The present invention also relates to a method for testing at least one object having a relative dielectric permittivity, the method comprising the following steps of:

providing a guided electromagnetic wave device section of the waveguide or transmission line-type in which the electromagnetic wave will propagate, extending along a longitudinal axis which is the axis of propagation of the electromagnetic wave, and having a hollow tubular electrical conductor inside which the electric field is established or several electrical conductors between which the electric field is established, and of a heterogeneous matching structure in mechanical contact with the electrical conductor(s), the heterogeneous matching structure including at least one extension element and at least one housing contained in or juxtaposed to the extension element, the extension element being made from a material having a relative dielectric permittivity as close as possible to that of the or each object and the heterogeneous matching structure having a dimension, along the longitudinal axis, equal to a non-zero multiple of half-wavelengths of the electromagnetic wave to be propagated in the guided electromagnetic wave device section;

placing the object in the housing, propagating an incident electromagnetic wave in the guided electromagnetic wave device section.

BRIEF DESCRIPTION OF THE DRAWINGS

The present invention will be better understood upon reading the description of exemplary embodiments provided, for purely information and in no way limiting purposes, with reference to the appended drawings in which:

FIGS. 8A, 8B1, 8B2, 8C1, 8C2 respectively illustrate an electromagnetic field exposure device based on a microstrip transmission line, coplanar transmission lines, a coaxial transmission line;

The different embodiments described have to be understood as being not exclusive to each other. Well-known structures are not represented in detail in order not to complexify unnecessarily the present invention. Identical, similar or equivalent parts of the different figures described hereinafter bear the same reference numerals so as to facilitate switching from one figure to another. The terms left, right, high, low, top, bottom and other are applicable to the embodiments shown and described in connection with the figures. The different parts represented in the figures are not necessarily drawn to a uniform scale, to make the figures more legible.

DETAILED DISCLOSURE OF PARTICULAR EMBODIMENTS

An exemplary exposure device for exposing at least one object to an electromagnetic field, subject of the present invention will now be described in reference to FIG. 1.

It is formed by a guided electromagnetic wave device section 1. In this example, it is a transmission line section, more particularly a two-wire-type transmission line section, formed by two parallel conductors 2.1, 2.2 extending along a longitudinal axis XX'. Both conductors 2.1, 2.2 sit on top of a support plate 3 of dielectric material, for example of glass. In this example, the conductors 2.1, 2.2 have a substantially square cross-section, with a 3 millimetres side, but other cross-sections are possible, for example rectangular ones. Both conductors are spaced apart from each other, for example by a distance of one millimetre, and thus are electrically insulated from each other. One of the ends of the transmission line section is intended to be connected to an electromagnetic wave source 4 and the other end is intended to be connected to a load 5. The source 4 and the load 5 are only just sketched.

The electromagnetic wave source 4 can be a radiofrequency source, a microwave frequency source or a pulsating source. The load 5 has an impedance equal to the characteristic impedance of the electromagnetic field exposure device. It can be the input impedance of a measuring apparatus as an oscilloscope.

The guided wave device section 1 is intended to convey an electromagnetic wave delivered by the source 4 to the load 5. The propagation is made along the longitudinal axis XX'. During this propagation, the electric field lines extend between both conductors 2.1, 2.2 of the transmission line, substantially perpendicular to the longitudinal axis XX' which is the axis of propagation of the guided waves. According to the invention, the guided wave device section 1 is equipped with a heterogeneous matching structure 6, comprising at least one housing 7 for the object 8 or each object and at least one extension element 9 which cooperates with the housing 7. The heterogeneous matching structure 6 extends longitudinally between both conductors 2.1, 2.2 of the transmission line 1. According to one characteristic of the invention, the extension element 9 is made from a material having a relative dielectric permittivity ε as close as possible to that of the object 8 or each object.

For the record, the relative dielectric permittivity ε of a material is a complex quantity which, within this context, is equal to:

$$\varepsilon = \varepsilon' - j\frac{\sigma_E}{2\pi f \cdot \varepsilon_0}$$

ε' is the real part of the relative dielectric permittivity of the material (it is also called real dielectric permittivity of the material in this document), $\sigma_E$ is the equivalent electrical conductivity of the material, it represents both electrical conduction and dielectric polarization phenomena, f is the frequency of the electromagnetic wave propagating in the material, $\varepsilon_0$ is the vacuum dielectric permittivity, j is the complex number such that: $j^2=-1$.

The dielectric properties of a material are defined either by $\sigma_E$ defined above in the formula of the relative dielectric permittivity ε, or the doublet ε', tan δ where tan δ is the tangent of the dielectric loss angle. Tan δ simultaneously takes into account conduction losses and losses due to polarization and relaxation phenomena:

$$\tan\partial = \frac{\sigma_E}{\omega\varepsilon_0\varepsilon'}$$

with ω=2πf.

In the rest of the description, both notations are employed.

In this context, the fact that the extension element 9 is made from a material having a relative dielectric permittivity £ as close as possible to that of the object 8 or each object, means that this material has a relative dielectric permittivity equal to the relative dielectric permittivity of the object 8 within 50%.

Advantageously, this material can have a relative dielectric permittivity equal to the relative dielectric permittivity of the object 8 or each object within 40%, preferably within 30%, further preferably within 25%, preferentially within 20%, and even more preferentially within 10%, or even within 0%. The latter proposal is ideal.

According to a preferred embodiment, the material of the extension element 9 has an equivalent electrical conductivity $\sigma_E$ as close as possible to that of the object 8 or each object. This means in this context, that the material of the extension element 9 has an equivalent electrical conductivity $\sigma_E$ equal to the equivalent electrical conductivity of the object 8 within 30%, preferably within 25%, further preferably within 20%, preferentially within 10%, or even within 0%.

It is quite possible for the material of the extension element 9 to have an equivalent electrical conductivity $\sigma_E$ that is zero or quasi-zero. By choosing a material for the extension element having an equivalent electrical conductivity $\sigma_E$ ideally equal to or close to the equivalent electrical conductivity of the object 8, the efficiency of the exposure device for exposing at least one object to an electromagnetic field is improved. If several extension elements are provided, they will be made preferably from the same material such that they have the same relative dielectric permittivity ε and the same equivalent electrical conductivity $\sigma_E$.

The heterogeneous matching structure 6 is in mechanical contact with each of the conductors 2.1, 2.2 of the transmission line section 1.

To improve the electrical coupling between the heterogeneous matching structure 6 and the conductors of the transmission line section of the guided electromagnetic wave device 1, it is possible to provide a metallization of the faces of the extension element 9 in mechanical contact with the conductors of the transmission line section. It is attempted that the mechanical contact is as close as possible and that the metallization enables a metal-metal contact to be made. If the electromagnetic field exposure device is based on a waveguide, the metallization is provided between the walls of the waveguide and the heterogeneous matching structure. It is assumed that in FIG. 8D subsequently described, the faces of the extension element 9 that have to come in contact with the walls of the waveguide section 80 are metalized.

According to another characteristic of the invention, the heterogeneous matching structure 6 has a dimension L, along the longitudinal axis XX', equal to a number n (non-zero integer) of half-wavelengths $\lambda_g/2$ of the guided electromagnetic wave $\lambda_g$ propagating in the electromagnetic field exposure device. It is assumed that in the example of FIG. 1, n=1.

A housing 7 for the object 8 has been represented at one end of the extension element 9. It is only one example among others because a plurality of locations is possible. In this example, the housing 7 is juxtaposed to the extension element 9, on the side of its downstream end with respect to the direction of propagation of the electromagnetic waves (marked by the arrow). The housing 7 is directly delimited by both conductors 2.1, 2.2, the bottom plate 3, on one side the end of the extension element 9 and on the other side, a plugging element 10 of dielectric material. This plugging element 10 takes the form of a partition wall. This plugging element 10 does not belong to the heterogeneous matching structure 6 and its length is not taken into account in the length L of the heterogeneous matching structure insofar as this plugging element is made from a material having a relative dielectric permittivity which is as close as possible to that of the dielectric material separating both conductors 2.1, 2.2 of the transmission line section 1. In the example described, it is air. The phrase "as close as possible" is given the same meaning as explained above.

To test the object 8, it is sufficient to place it in the housing 7 and to apply an incident electromagnetic wave such that it propagates in the guided wave device section 1. This electromagnetic wave is generated by the source 4 and propagates to the load 5.

Figure 2A:
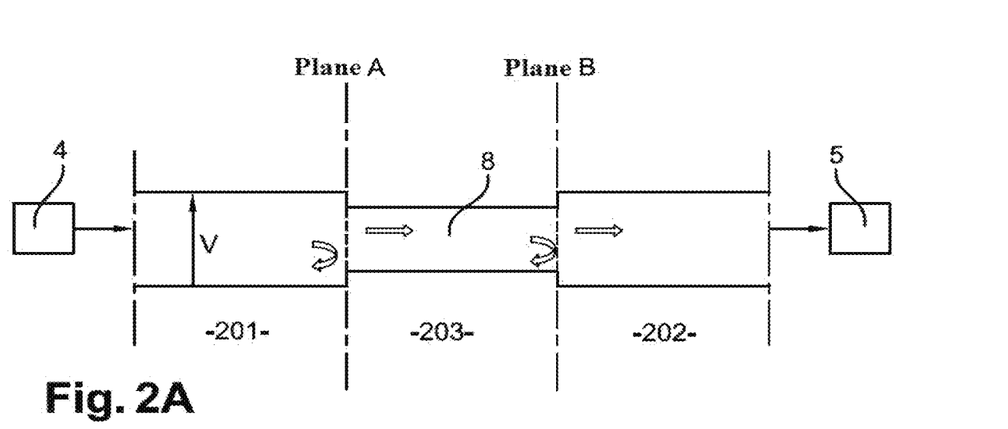
FIGS. 2A, 2B model a transmission line having two impedance discontinuities, the distance between planes A and B being, at the rated working frequency, any frequency in the case of FIG. 2A and equal to half the wavelength of the wave propagating in the transmission line in the case of FIG. 2B, this figure illustrating the principle on which the present invention relies.

A transmission line having two impedance discontinuities can be modelled by cascading three quadrupoles, each corresponding to a line segment. FIG. 2A is referred to. Both end quadrupoles 201, 202 represent an input segment and an output segment of the device, they have a characteristic impedance $Z_c$ equal to 500 most often. The centre quadrupole 203 represents a segment containing the object to be exposed to the electromagnetic waves, its length is that of the object 8 which is any length. Its characteristic impedance $Z_{obj}$ is reduced with respect to the impedance $Z_c$ of the two other quadrupoles 201, 202 by a factor higher than 1 and lower than or equal to the square root of ε', with £' the real relative dielectric permittivity of the object.

The characteristic impedance discontinuity caused by the presence of the object to be tested is at the root of the occurrence of reflection phenomena at the planes A and B boundaries between two of the successive quadrupoles 201-202; 202-203. Plane A is the boundary between the input segment and the centre segment, plane B is at the boundary between the centre segment and the output segment. The electromagnetic field exposure device thus suffers from a poor input matching and significant insertion losses. This phenomenon is all the more intense as the object 8 occupies a significant volume in the transmission line.

As set forth above in the case of a two-wire transmission line, to achieve a proper electrical coupling between the object and the electric field, it is preferable that the object is in mechanical contact with the conductors 2.1, 2.2 of the transmission line 2 between which the electric field is established.

Figure 2B:
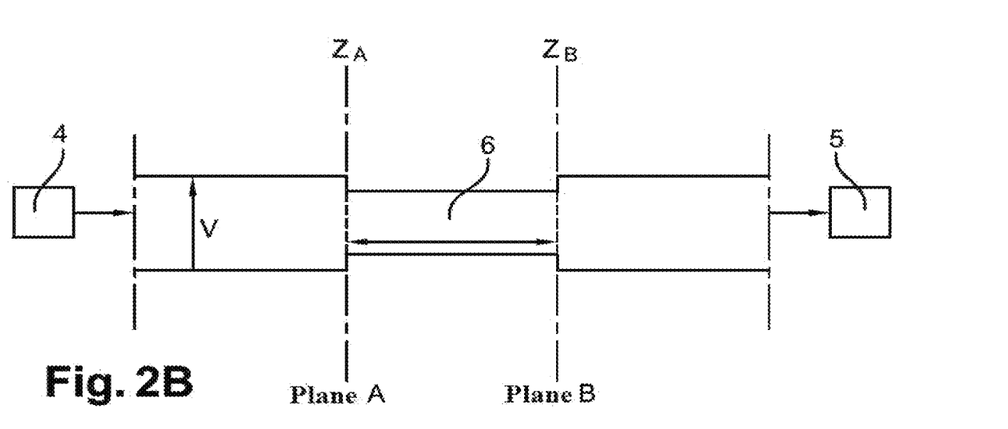

To meet at best these two contradictory requirements, it is for this reason that the present invention suggests to place in the transmission line the heterogeneous matching structure with a length L equal to $n \cdot \lambda_g/2$ as illustrated in FIG. 2B.

Thus, the current/voltage ratio in plane A is equal to the current/voltage ratio in plane B. Impedance $Z_A$ seen in plane A is equal to impedance $Z_B$ seen in plane B. If the electromagnetic field exposure device is loaded at the output thereof by an impedance equal to its characteristic impedance $Z_c$ (generally 50Ω), impedance $Z_A$ is thereby equal to impedance $Z_c$. Thus, even in the presence of an object under test, the electromagnetic field exposure device has a much better input matching than in prior art and much lower insertion losses than in prior art.

The principle on which the invention relies remains valid and applicable with guided wave devices with a characteristic impedance different from 50Ω.

Figure 1:
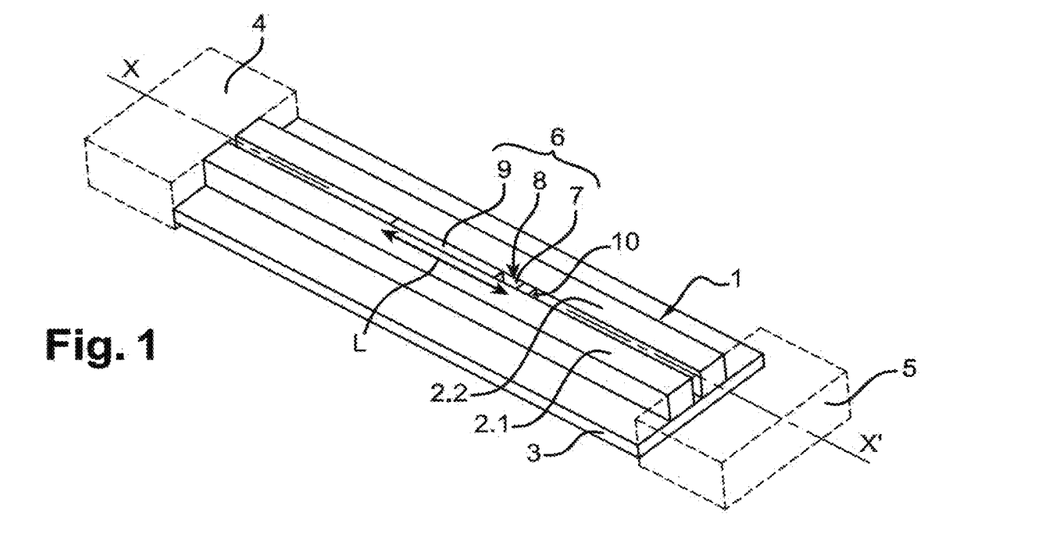
FIG. 1 illustrates an exposure device for exposing an object to an electromagnetic field, in accordance with the invention, and based on a two-wire transmission line.

With an electromagnetic field exposure device having a structure comparable to that illustrated in FIG. 1, simulations have been made, for an electromagnetic wave with a frequency equal to 1.5 GHz, with a heterogeneous matching structure having a cross-section of 1 mm×3 mm and a length L of 14.6 mm and a second structure with the same dielectric characteristics but having a cross-section of 1 mm×3 mm and a length L of 4 mm. The housing for the object is nearly limited on one side by the extension element and on the other side by a wall of a dielectric material, being polytetrafluoroethylene.

The object under test is distilled water the real relative dielectric permittivity ε' of which is 78.4 and the equivalent electrical conductivity $\sigma_E$ is 5.6 $10^{-6}$ S/m at the frequency 1.5 GHz. The extension element which is contiguous to the object under test is of so-called high real relative dielectric permittivity ceramics, herein in this example, its real relative dielectric permittivity is equal to about 83.

Figure 3A:
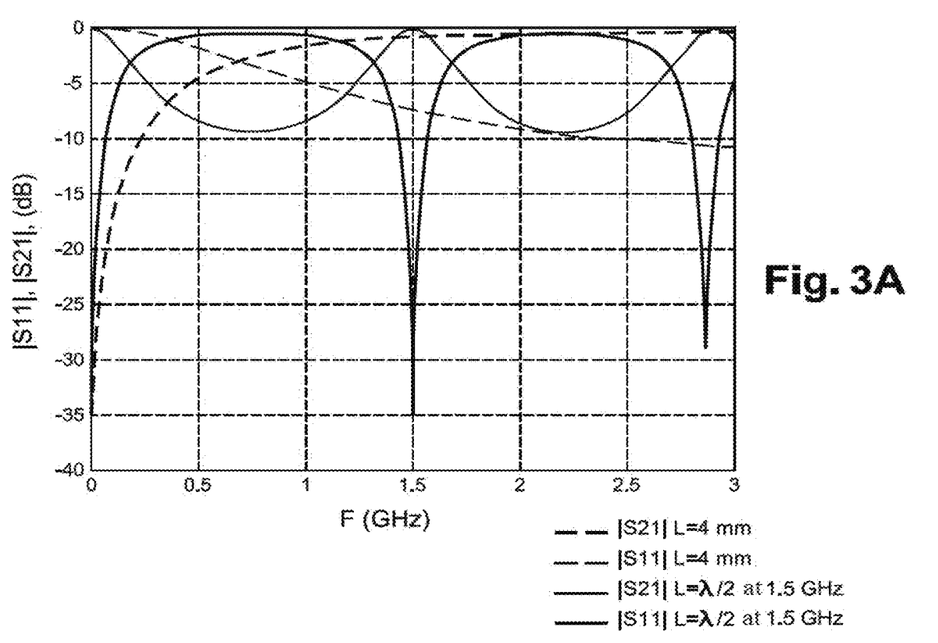
FIG. 3A illustrates the input matching and the insertion losses of the electromagnetic field exposure device of FIG. 1, as well as the input matching and insertion losses of an electromagnetic field exposure device in which the object, of any length, is placed alone in the exposure device.

The graph of FIG. 3A represents the coefficients S11 (input reflection coefficient when the output is matched) and S21 (direct transmission coefficient when the output is matched) for the heterogeneous matching structure with a 14.6 mm length and the second structure with a 4 mm length in the band 0-3 GHz. It is noticed that the input matching is much better and that the insertion losses are lower with the heterogeneous matching structure at the frequency 1.5 GHz. In the electromagnetic field exposure device equipped with the second structure with a 4 mm length, the input matching and insertion losses are not at all satisfactory at the highest frequencies and in particular at 1.5 GHz, being the working frequency in this example.

It will be noted that the half-wavelength of an electromagnetic wave propagating in a medium having a real relative dielectric permittivity of about 78.4 at a frequency of 1.5 GHz is actually 11.3 mm. In simulations made with the electromagnetic field exposure device of FIG. 1, the length L of the heterogeneous matching structure has been adjusted because of the nature of the support plate 3 under the conductors 2.1, 2.2 and the presence of air above the conductors. Indeed, the electric field lines, arising between both conductors, are preferentially distributed in the object and in the extension element 9 but also in the support plate 3 and in the air above both conductors. The dimensioning of the heterogeneous matching structure should take into account the real relative dielectric permittivity of the extension material (here the ceramics) (ε'≈83), of the glass support plate (ε'≈4) and air (ε'≈1).

As regards the equivalent electrical conductivities, those of glass and air are considered as zero.

A length L of 11.3 mm would be given to the heterogeneous matching structure, if the propagation along both conductors 2.1, 2.2 were homogeneous in a material of a relative dielectric permittivity equal to that of the extension element 9 and of the object 8.

Figure 3B:
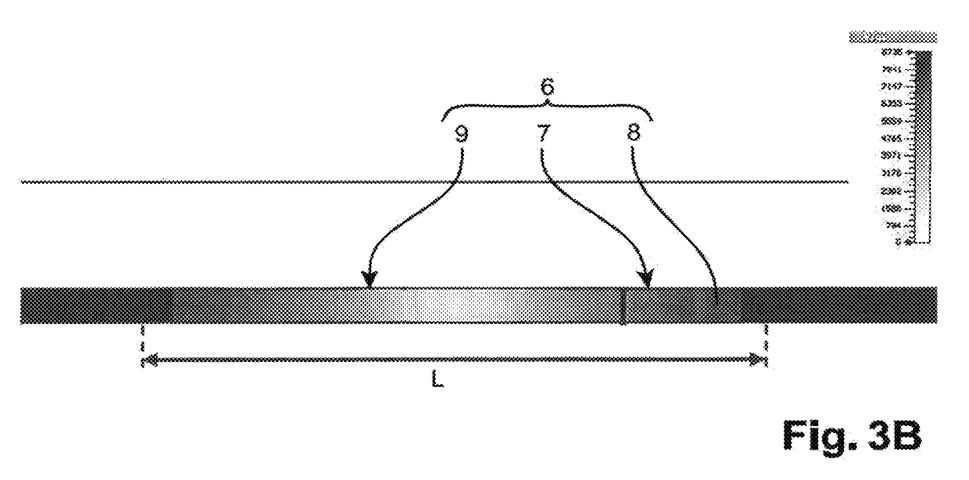
FIG. 3B illustrates the amplitude of the electric field at the heterogeneous matching structure of the electromagnetic field exposure device of FIG. 1.

The homogeneity of the electric field in the heterogeneous matching structure will now be considered referring to FIG. 3B. It represents the amplitude of the electric field in the heterogeneous matching structure 6 of FIG. 1. This amplitude varies. It is minimal in the centre of the heterogeneous matching structure 6 and is maximal at its ends. In the example of FIG. 1, the object 8 is placed at one end of the heterogeneous matching structure 6. To ensure a proper homogeneity of the electric field, the dimension of the object to be tested is matched along the axis XX' of propagation of the waves. By adjusting its dimension, the object is placed in a zone where the electric field does not vary greatly and preferably where it is maximal. In the example described, the dimension of the sample corresponds to about 20% of the length L of the heterogeneous matching structure 6 and the homogeneity of the electric field is estimated at 15%.

It is set out that ceramics, for example based on barium, samarium, titanium, can have a real relative dielectric permittivity ε' between about 70 and 80. Materials, other than ceramics, could be used to make the extension element, for example a gel such as agar or a composite material can be used. These materials have high real relative dielectric permittivities, greater than 70 for example. These materials of course are suitable, if, within the scope of the invention, they meet the requirement connecting the relative dielectric permittivities of the object and of the extension element.

Figure 4A:
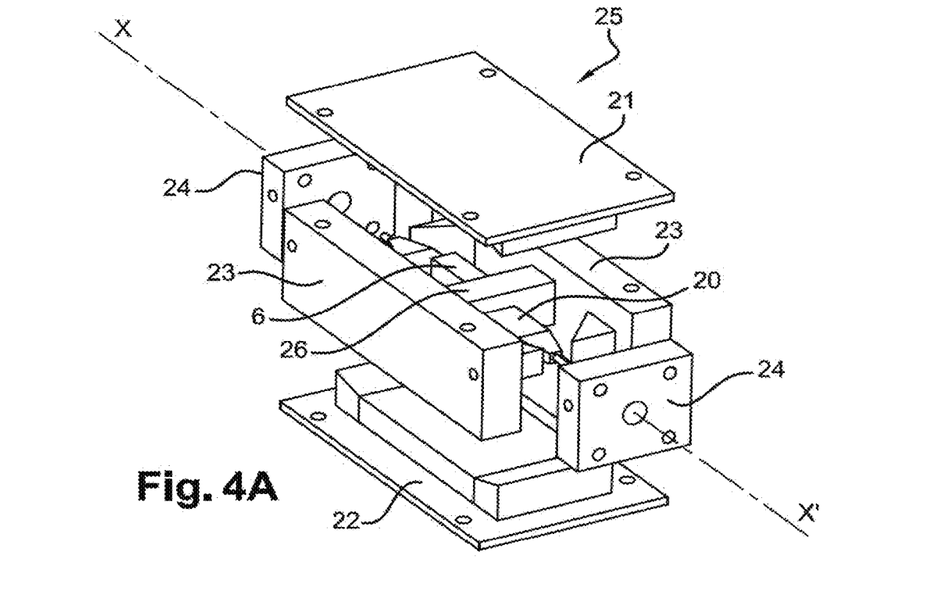
FIGS. 4A to 4C illustrate an exploded view, a working position view and a closer view on the heterogeneous matching structure, of an electromagnetic field exposure device according to the invention, based on a tri plate transmission line.
Figure 4B:
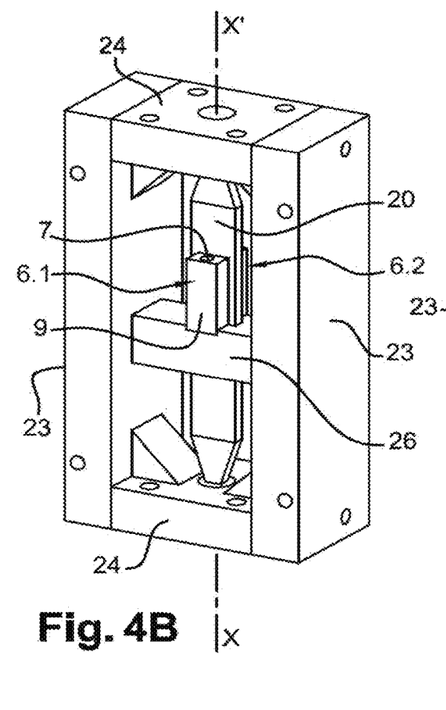
Figure 4C:
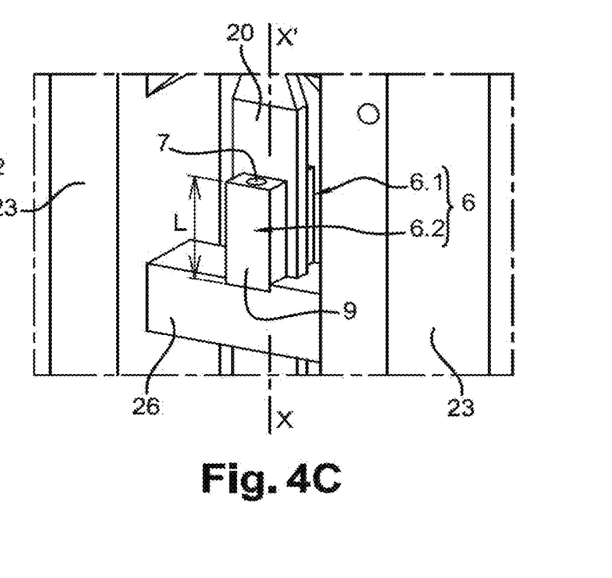

FIGS. 4A, 4B, 4C are referred to, which respectively show an exploded view, a view in an operating position (ground conductors removed) and an enlarged partial view of another alternative of an electromagnetic field exposure device in accordance with the invention.

The electromagnetic field exposure device is formed by a triplate line-type transmission line section. A triplate-type transmission line conventionally includes a centre conductor 20 and two parallel conductors 21, 22, facing each other, on either side of the centre conductor 20, at the same distance from the latter. The centre conductor 20 extends along a longitudinal axis XX' which is also the axis of propagation of the electromagnetic wave. It is flat strip-shaped with two main faces.

Both parallel conductors 21, 22 play the role of an electrical ground. Two electrically conductive flanks 23 facing each other can be provided. Each of them electrically connects sidewise both parallel conductors 21, 22. They enable both parallel conductors 21, 22 to be forced to the same electrical potential, a closed transmission line to be obtained and the transmission line to be rigidified. Both flanks 23 and both parallel conductors 21, 22 form a tubular enclosure 25 containing the centre conductor 20. Both electrically conductive flanks however are not necessary as far as the electromagnetic wave transmission is concerned.

Two electrically conductive transverse tips 24 are provided at both ends of the centre conductor 20. They enable the input of the transmission line section to be connected to the electromagnetic wave source and to the load. The electromagnetic wave source and the load are not represented in these figures in order not to overload them. At least one wedge 26 of dielectric material, for example of polytetrafluoroethylene, can be provided to mechanically hold the centre conductor 20 with respect to the tubular enclosure 25. In the example described, the wedge 26 bears against both flanks 23 and the centre conductor 20 passes through it. Other configurations are possible, in particular, the wedge could be omitted.

It is assumed, in the non-limiting example described, that the overall length between both transverse tips is about 10 cm and that the overall width between both flanks 23 is about 5 cm.

In the example of FIG. 4, the heterogeneous matching structure 6, is subdivided into two heterogeneous matching half-structures 6.1 and 6.2, each placed between one of the main faces of the centre conductor 20 and one of the ground conductors 21 or 22 and in mechanical contact with the centre conductor 20 and the associated ground conductor 21 or 22. The triplate line thus equipped with both heterogeneous matching half-structures 6.1, 6.2 is symmetrical relative to the centre conductor 20. These two heterogeneous matching half-structures 6.1, 6.2 each comprise an extension element 9 having the form of a parallelepiped block. Each extension element 9 can have one end embedded in one of the wedges 26 or only in mechanical contact. Each extension element 9 incorporates a housing 7 for the object. The housing 7 is a blind hole extending in the extension element 9 substantially along the longitudinal axis XX'. In FIGS. 4B and 4C, the electromagnetic field exposure device has been placed upside-down relative to the view of FIG. 4A. This blind hole 7 is for accommodating an object which can be liquid. In operation, the blind hole 7 is full to the brim with the object and it is not necessary to provide a closing plug to seal it. Filling is made by removing at least one of the ground conductors 21, 22. They have been precisely removed on FIG. 4B.

An electromagnetic field exposure device as the one illustrated in FIGS. 4A to 4C has been simulated using the simulation software CST Microwave Studio from Computer Simulation Technology AG.

The different materials of the electromagnetic field exposure device have been modelled in the following way:
Centre conductor, ground conductors, flanks, transverse tips: aluminium (CST electrical model):
  Electrical conductivity $\sigma = 3.56 \times 10^{+7}$ S/m
Wedge: polytetrafluoroethylene (CST electrical model):
  Real relative dielectric permittivity $\varepsilon' = 2.1$
  Dielectric loss angle tangent $\tan \delta = 2 \times 10^{-4}$
Extension element: high permittivity ceramics (user-defined model):
  Real relative dielectric permittivity $\varepsilon' = 78$
  Dielectric loss angle tangent $\tan \delta = 5 \times 10^{-4}$
Object to be tested: biological sample in solution (user-defined model):
  Real relative dielectric permittivity $\varepsilon' = 78$
  Equivalent electrical conductivity $\sigma_E = 1$ S/m Each of the heterogeneous matching half-structures 6.1, 6.2 has a length L equal to a half-wavelength (n=1) of the guided wave propagating in the electromagnetic field exposure device, at the frequency 1.5 GHz, that is: 15.4 mm. The electric field exposure device is tuned to the frequency 1.5 GHz.

Figure 5A:
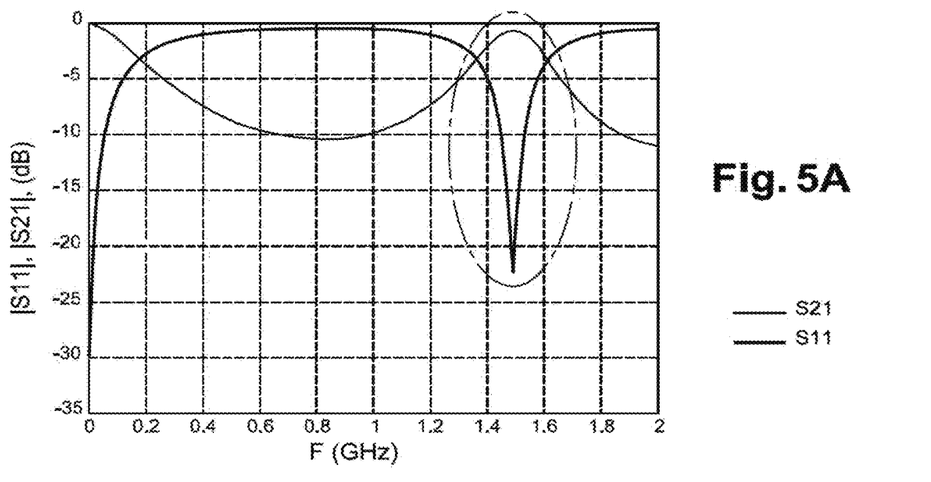
FIG. 5A illustrates the input matching and insertion losses of the electromagnetic field exposure device of FIGS. 4A-4C.

FIG. 5A represents the variation in the coefficients S11 (input reflection coefficient when the output is matched) and S21 (direct transmission coefficient when the output is matched) for the electromagnetic field exposure device of FIGS. 4A to 4C in the band 0-2 GHz. At the frequency 1.5 GHz, the insertion losses are lower than −1 dB and the input matching is better than −15 dB.

Figure 5B:
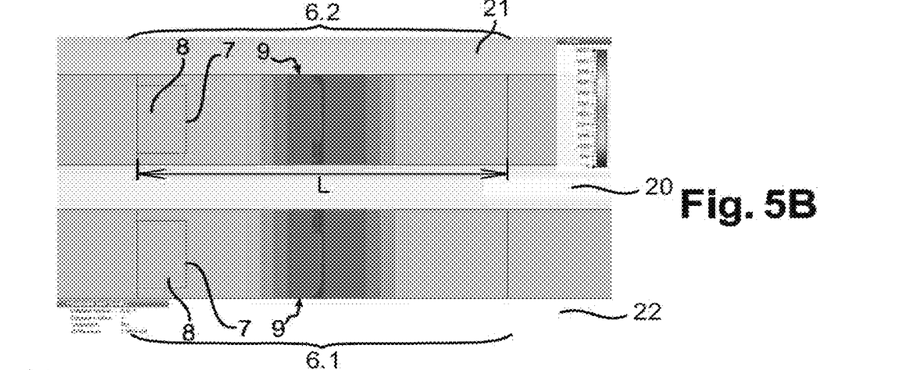
FIG. 5B illustrates the amplitude of the electric field at the heterogeneous matching structure seen in FIG. 4C.

FIG. 5B shows the amplitude of the electric field in the electromagnetic field exposure device of FIGS. 4A to 4C excited by a sinusoidal signal at a frequency of 1.5 GHz, seen in a top view. An object 8 is placed in each of the blind holes 7 housed in the extension elements 9. These blind holes 7 are represented in this figure, to the left of both heterogeneous matching half-structures 6.1, 6.2. In the centre part, the centre conductor 20 is located on either side of the heterogeneous matching half-structures, both conductors 21, 22 playing the role of an electrical ground.

It can be noticed, as expected, that the homogeneity of the electric field in the object is proper, the variation in the electric field is lower than 10%. This evaluation is based on previous simulations.

Figure 6A:
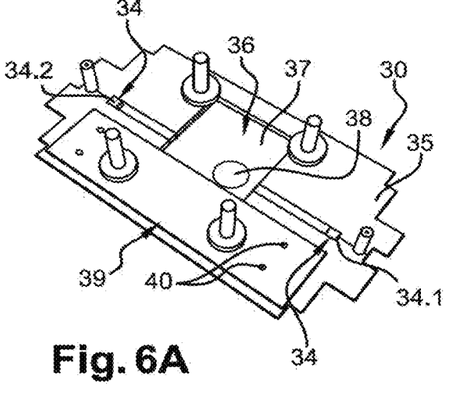
FIGS. 6A to 6C respectively illustrate the accommodating part, the removable part and both parts joined of an electromagnetic field exposure device according to the invention allowing a use under microscope.
Figure 6B:
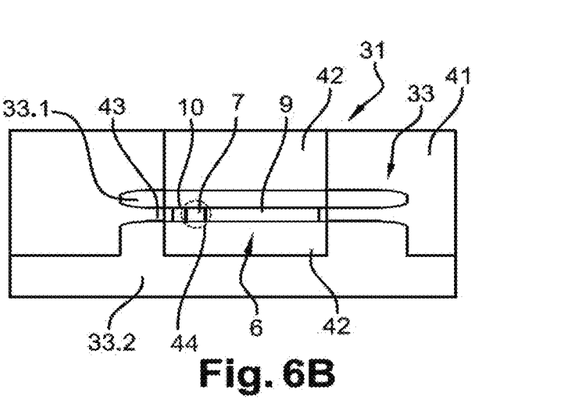
Figure 6C:
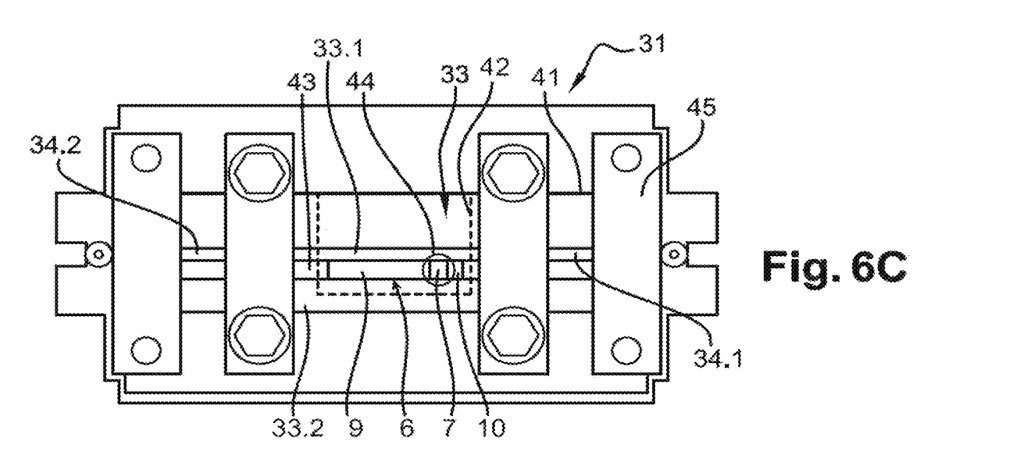

Another exemplary electromagnetic field exposure device subject of the invention will now be considered. This device enables the object under test to be observed under a microscope during the exposure to the electromagnetic field. FIGS. 6A, 6B, 6C are referred to. The electromagnetic field exposure device is split into two parts 30, 31: a removable part 31 including the heterogeneous matching structure 6, and an accommodating part 30 for accommodating the removable part 31. The accommodating part 30 is for being placed on the stage of a microscope (not represented).

FIG. 6A is a top view of the accommodating part 30, FIG. 6B is a bottom view of the removable part 31 and FIG. 6C is a top view illustrating both parts 30, 31 joined in a working position. One advantage of providing a removable part 31 is that it can be autoclave sterilized.

The mobility of the removable part 31 also provides a flexibility in use. Several removable parts can be loaded with objects to be tested and each be placed in turn on the accommodating part 30, the accommodating part 30 remaining connected and in place on the microscope stage.

The electromagnetic field exposure device is formed by a first transmission line section 33 for being placed in the working position between two other transmission line sections 34.

In the non-limiting example described in FIG. 6, the first transmission line section 33 is a two-wire line section. The two other transmission line sections 34 are microstrip line sections 34. The two-wire line section 33 is being electrically connected to each of the microstrip transmission line sections 34. The two-wire line section 33 is located on the removable part 31, both microstrip line sections 34 are on the accommodating part 30.

The removable part 31 includes the two-wire line section 33 sandwiched, in its centre part, between a support plate 41 and a transparent coverslip 42 of electrically insulating material. The support plate 41 will be in the top position when the removable part 31 and the accommodating part 30 cooperate in working position. The support plate 41 is made from an electrically insulating material such as, for example, polycarbonate, epoxide polymer, polytetrafluoroethylene. The transparent coverslip 42 can be of glass in order to be transparent to the microscope beam.

The two-wire line section 33 conventionally includes two conductors including, one so-called transmission conductor, (reference 33.1) and one so-called ground conductor, (reference 33.2). These two conductors 33.1, 33.2 are substantially parallel, they extend along a same longitudinal axis and are integral of the support plate 41. A trench 43 is defined between the ground conductor 33.2 and the transmission conductor 33.1.

The accommodating part 30 includes a base support 35 of electrically insulating material on which the removable part 31 will be pressed, on the transparent coverslip 42 side. The base support 35 can be provided with a cavity 36 at which the two microstrip line sections having to house the transparent coverslip 42 terminate. The base support 35 includes a port 38 above which the object will be located when both parts 30, 31 are joined in a working position and through which the microscope beam will propagate. If the base support includes a cavity 36, the port will be located at the bottom 37 of the cavity 36. The cavity 36 is for housing the transparent coverslip 42.

The conductor strips 34.1 and 34.2 of both microstrip line sections 34 have references 34.1 and 34.2 respectively and extend on a main face of the base support 35. The lower ground plane of the microstrip line sections 34 is returned to an upper ground plane 39 on the main face of the base support 35 using conductor rivets 40, sufficiently away from the conductor strips 34.1 and 34.2 so as to prevent any parasitic coupling at the accesses to the microstrip line sections 34. The upper ground plane 39 is used for connecting the removable part 31, as explained later. The electromagnetic wave source is to be connected to one of the microstrip line sections 34 and the load is to be connected to the other microstrip line section 34.

The cavity 36 can be omitted if the transparent coverslip 42 is embedded in the removable part 31 while being flush with the surface. It can be bonded to the removable part 31.

When the accommodating part 30 and the removable part 31 cooperate with each other in the working position, the transparent coverslip 42 is pressed against the base support 35 or housed in the cavity 36, if any. When both parts 30 and 31 cooperate, the transmission conductor 33.1 electrically contacts, at each of its ends, one of the conductor strips 34.1, 34.2 of the microstrip line sections 34. The ground conductor 33.2 electrically contacts the upper ground plane 39.

The electromagnetic field exposure device further includes, in accordance with the invention, a heterogeneous matching structure 6 the length of which is equal to an integer number of half-wavelengths of the electromagnetic wave to be propagated in the electromagnetic field exposure device. The heterogeneous matching structure 6 is placed in the trench 43 in mechanical contact with the support plate 41, the ground conductor 33.2 and the transmission conductor 33.1. This heterogeneous matching structure 6 is similar to that represented in FIG. 1 with the extension element 9 and the housing 7 for the object to be tested which are contiguous. The object is not visible.

The housing 7 for the object is longitudinally delimited on one side by a partition wall 10 of dielectric material, on the other side by the extension element 9 and sidewise by the support plate 41, the transparent coverslip 42, the ground conductor 33.2 and the transmission conductor 33.1. This housing 7 is proof and can accommodate a liquid sample to be exposed to electromagnetic waves. The partition wall 10 can be for example of polytetrafluoroethylene. The support plate 41 is equipped with a port 44 for filling or emptying the housing 7, this port 44 can be plugged with a plug (not represented). Pressing elements 45 are provided to hold the removable part 31 pressed against the accommodating part 30 as illustrated in FIG. 6C.

An electromagnetic field exposure device as the one illustrated in FIGS. 6A to 6C has been simulated using the simulation software CST Microwave Studio.

The different materials of the electromagnetic field exposure device have been modelled in the following way:
Conductors of the two-wire line section and the microstrip line sections: perfect electrical conductors, a perfect electrical conductor has a zero resistance.
Partition wall: polytetrafluoroethylene (CST electrical model):
  Real relative dielectric permittivity $\varepsilon'=2.1$
  Dielectric loss angle tangent $\tan \delta 5=2\times10^{-4}$
Extension element: high permittivity ceramics (user-defined model):
  Real relative dielectric permittivity $\varepsilon'=78$
  Dielectric loss angle tangent $\tan \delta=5\times10^{-4}$
Object to be tested: Liquid sample (user-defined model):
  Real relative dielectric permittivity $\varepsilon'=78$
  Dielectric loss angle tangent $\tan \delta=0.089$.

The heterogeneous matching structure 6 has a length L equal to a half-wavelength (n=1) of the guided wave propagating in the electromagnetic field exposure device, that is 14.9 mm. The electromagnetic field exposure device is here tuned to the frequency 1.5 GHz.

Figure 7A:
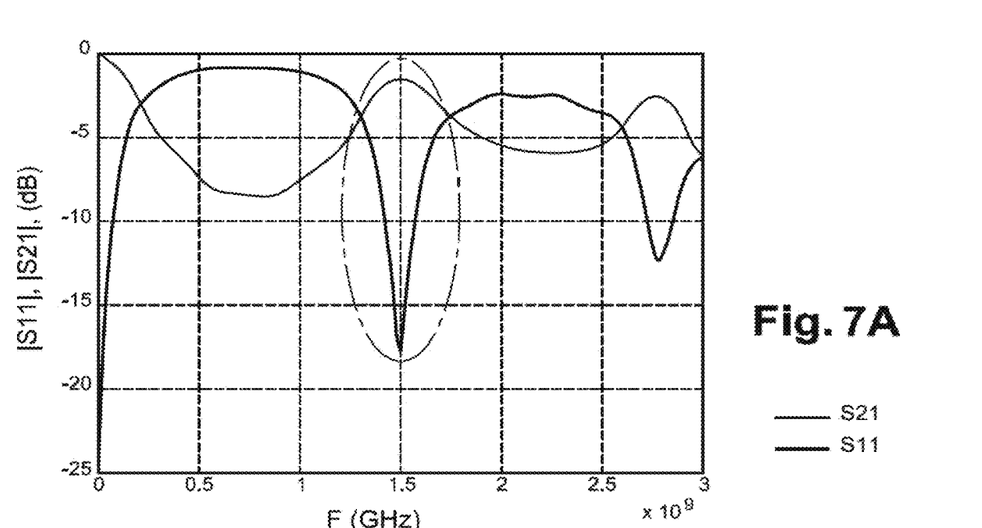
FIG. 7A illustrates the input matching and insertion losses of the electromagnetic field exposure device of FIGS. 6A-6C.

FIG. 7A represents the coefficients S11 (input reflection coefficient when the output is matched) and S21 (direct transmission coefficient when the output is matched) for the electromagnetic field exposure device of FIGS. 6A to 6C in the band 0-3 GHz. At the frequency 1.5 GHz, the insertion losses amount to −2 dB and the input matching is better than −15 dB.

Figure 7B:
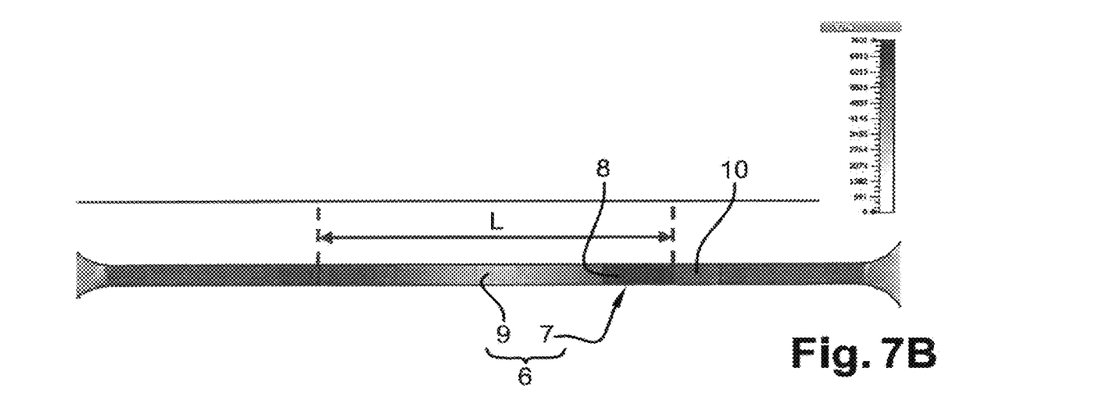
FIG. 7B illustrates the amplitude of the electric field at the heterogeneous matching structure seen in FIG. 6B.

FIG. 7B shows the amplitude of the electric field in the electromagnetic field exposure device of FIGS. 6A to 6C, in a top view, excited by a sinusoidal excitation signal at a frequency of 1.5 GHz. The object 8 is represented in this figure on the right part of the heterogeneous matching structure 6. The partition wall 10 does not make part of the heterogeneous matching structure 6 insofar as it is made from a material having a relative dielectric permittivity as close as possible to that of air in this case.

It can be noticed, as expected, that the homogeneity of the electric field in the object is proper, the variation in the electric field is lower than 10%. The intensity of the electric field is maximal at the object. This evaluation is based on previous simulations.

Figures 8A, 8B:
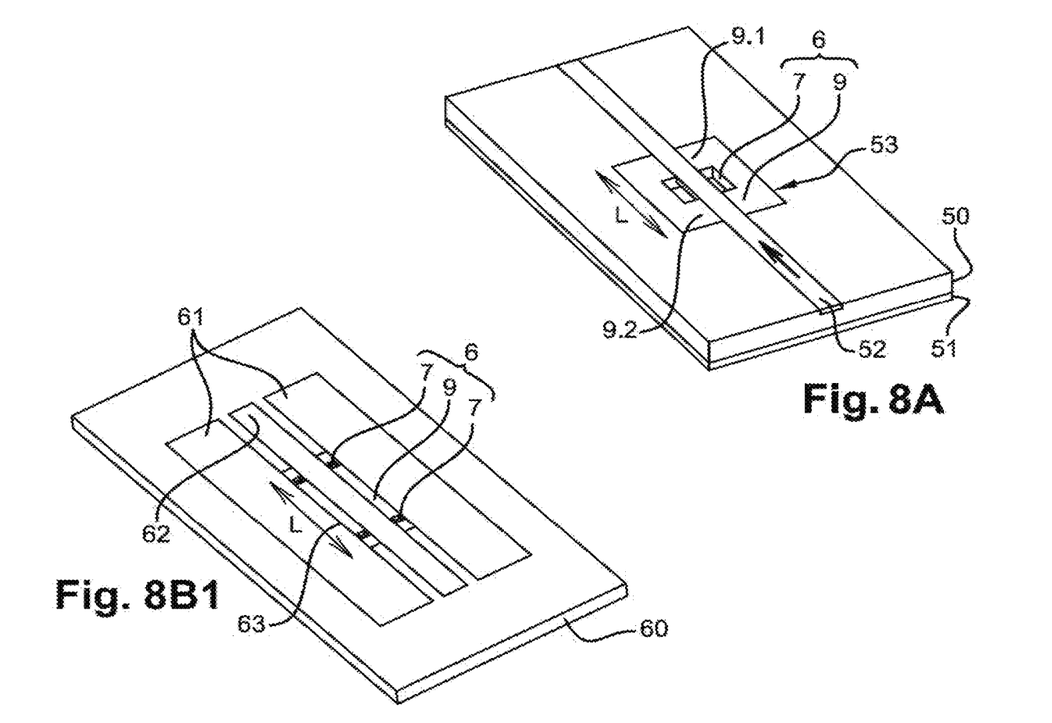

In FIG. 8A, the electromagnetic field exposure device is formed by a microstrip line section. It includes a substrate 50 of dielectric material a main face of which is metallized to form the electric ground plane 51 and the other main face of which bears an electrically conductive strip 52. The substrate 50 is pierced by a through hole which acts as an accommodating cavity 53 for the heterogeneous matching structure 6. This cavity 53 has as its bottom the electric ground plane 51, it is limited sidewise by the material of the substrate 50 and the conductor strip 52 passes through it in a bridge manner. It has, as a dimension in the direction of the conductor strip 52, the length L of the heterogeneous matching structure 6.

The heterogeneous matching structure 6, once in the cavity 53, is in mechanical contact with the conductor strip 52, the ground plane 51. The heterogeneous matching structure 6 is formed, in this non-limiting example, by the extension element 9 which takes the form of a block having substantially the dimensions and volume of the cavity 53.

This block is provided with a housing 7 for the object, this housing 7 being located under the strip conductor 52. In this example, the housing 7 is not at the end of the extension element 9. It is placed otherwise in its centre part. This centre position also allows a proper homogeneity in the electric field being here at a lower level. Thus, it is placed between two segments 9.1, 9.2 of the extension element 9. One of the segments is on the right and the other on the left thereof. Of course, it would be possible that the housing 7 is more or less offset, along the conductor strip 52 on the right or on the left relative to the position shown, up to contact the substrate 50. The length L of the heterogeneous matching structure 6 is indicated, it is counted along the conductor strip 52. In this example, the object is not represented. The direction of propagation of the electromagnetic wave is indicated by the arrow.

In FIG. 8B1, the electromagnetic field exposure device is formed by a coplanar transmission line section. It should be recalled that a coplanar line includes a substrate 60 of dielectric material on which a centre conductor strip 62 and two electrically conductive side strips 61 which act as an electrical ground extend. Here again, the substrate 60 includes a non-through hole or accommodating cavity 63 for the heterogeneous matching structure 6. This cavity 63 is housed under the centre conductor 62 and extends to the side strips 61, such that the heterogeneous matching structure 6 that will be housed in the cavity 63 can be in mechanical contact with the centre conductor 62 and these two side strips 61. The cavity 63 has as its dimension, in the direction of the centre conductor 62, substantially the length L of the heterogeneous matching structure 6. The heterogeneous matching structure 6 is formed in this example by the extension element 9 which takes the form of a block having a dimension, along the centre conductor 62, lower than that of the cavity 63. There are four housings 7, each for one object. They are placed longitudinally, on either side of the extension element 9, and transversally, on either side of the centre conductor 62, in a symmetrical way. The space remaining between the extension element 9 in a substantially central position in the cavity, and both edges, substantially perpendicular to the centre conductor 62, of the cavity 63 form the housings 7. Of course, a single housing upstream or downstream of the extension element could have been provided, by wedging the extension element against one of the edges of the cavity 63.

Figure 8B:
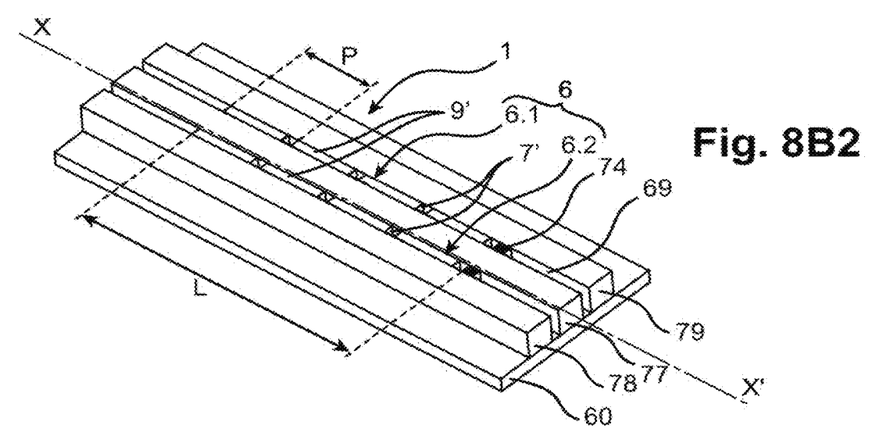

In FIG. 8B2, the electromagnetic field exposure device is formed by a coplanar transmission line section 1 with three parallel conductors thicker than those shown in FIG. 8B1. The substrate is referenced 60, the centre conductor bears the reference 77 and the end conductors the references 78 and 79. In this configuration, there is no cavity in the substrate 60. The heterogeneous matching structure 6 is subdivided into two half-structures 6.1, 6.2 each of which being placed in the space delimited by two neighbouring different conductors 78, 77 or 77, 79. The heterogeneous matching half-structures 6.1, 6.2 are each in mechanical contact with two conductors. Each heterogeneous matching half-structure includes an extension element 9' cooperating with several housings 7', for objects to be tested. The housings 7', cooperating with a same extension element 9, are spaced by a pitch p equal to a half-wavelength of the electromagnetic wave to be propagated in the electromagnetic field exposure device. The heterogeneous matching structure 6 has a dimension L, equal to a multiple higher than two of half-wavelengths of the electromagnetic wave to be propagated in the electromagnetic field exposure device. The same is true for each heterogeneous matching half-structure 6.1, 6.2. The dimension L is measured along the axis XX' which is the longitudinal axis of propagation of the electromagnetic wave in the electromagnetic field exposure device. The electromagnetic field exposure device has a symmetry relative to a main axis of the centre conductor 77. This axis is the same as the axis XX'. In the example illustrated in FIG. 8B2 which is not limiting, four housings 7' have been represented per heterogeneous matching half-structure 6.1 or 6.2. Three of them are contained in the extension element 9' and the last one, placed at one end of the extension element 9', is juxtaposed to the latter. It is delimited on one side by the extension element 9' and on the other side by a plugging element 74. This plugging element 74 is bordered opposite the housing by a dielectric material 69. Herein, in this example, it is air. This plugging element 74 is excluded from the heterogeneous matching half-structure insofar as it is made from a material having a relative dielectric permittivity as close as possible to that of the dielectric material 69 that borders it.

Figure 8C:
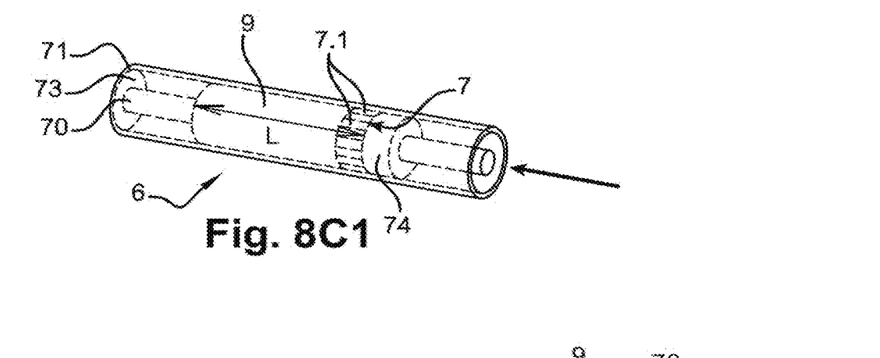
Figure 8C:
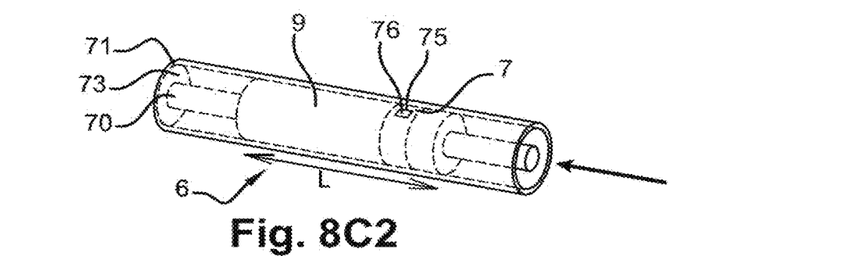

In FIGS. 8C1, 8C2, the electromagnetic field exposure device is formed by a coaxial transmission line section. It should be recalled that a coaxial line includes a substantially cylindrical centre conductor 70 or core concentrically surrounded by a tubular outer conductor 71 or braid acting as an electrical ground, both conductors 70, 71 are separated by a dielectric material 73 such as polytetrafluoroethylene or air, or even vacuum. A segment of the dielectric material 73 has been removed, it has been replaced by the heterogeneous matching structure 6. The latter has a tubular shape, it is wrapped around the centre conductor 70. It is in mechanical contact on one hand with the centre conductor 70 and on the other hand with the tubular outer conductor 71. It includes, in the examples presented in FIGS. 8C1 and 8C2, an extension element 9 and a housing 7 for the object which cooperates with the extension element 9. In FIG. 8C1, the extension element 9 takes the form of a sleeve, the housing 7 corresponds to a space radially delimited between the centre conductor 70 and the outer conductor 71 and sidewise between the extension element 9 and an annular electrically insulating plugging element 74, placed opposite the extension element 9. This plugging element 74 does not make part of the heterogeneous matching structure 6 insofar as this plugging element 74 is made from a material having a relative dielectric permittivity as close as possible to that of the dielectric material 73 separating the centre conductor 71 from the outer tubular conductor 72 and bordering the plugging element 74 opposite the housing 7.

This plugging element 74 takes the form of a ring. The plugging element 74 is removable to enable the housing 7 to be filled and emptied. The length L of the heterogeneous matching structure 6 is illustrated as well as the direction of propagation of the electromagnetic field. In this example, the housing 7 for the object is located upstream of the heterogeneous matching structure 6 relative to the direction of propagation of the electromagnetic field. Of course, it could have been located downstream. It is possible that the housing 7 is divided into several compartments 7.1 to be capable of simultaneously exposing several objects to the electromagnetic field. In FIG. 8C1, it is assumed that the housing is radially compartmentalized into several compartments 7.1 as regions. This compartmentalization is not only applied to this embodiment, but it can also be applied to the other embodiments described.

Figure 8D:
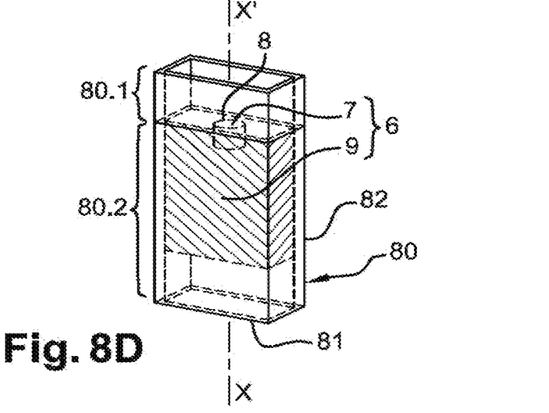
FIGS. 8D and 8E respectively illustrate an electromagnetic field exposure device based on a rectangular waveguide, a circular waveguide.
Figure 8E:
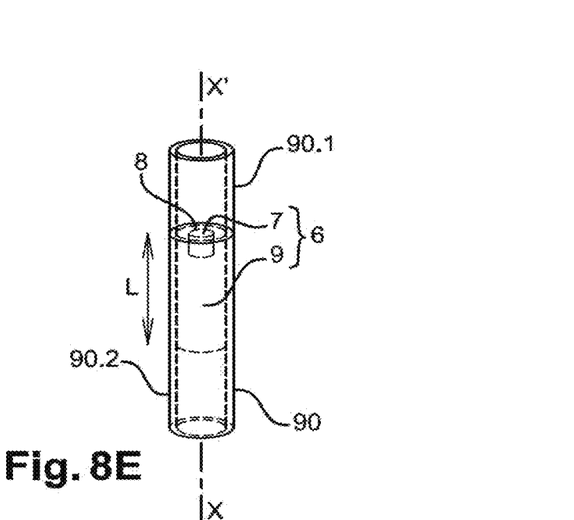

If the electromagnetic field exposure device of FIG. 8C1 is for being vertically used, the housing 7 being placed on top, the plugging element 74 can be omitted. In a vertical operating mode, the housing can take the form of one or several blind holes in the upper part of the extension element 9, as represented in FIGS. 8D and 8E subsequently described.

It can also be contemplated that the outer conductor 70 and the centre conductor 71 are formed by two dismountable and re-assemblable segments. The boundary between both can be located at the housing 7 so as to be capable of readily fill it.

In the embodiment illustrated in FIG. 8C2, the heterogeneous matching structure 6 includes the extension element 9 which takes the form of a sleeve and a single annular-shaped housing 7 pierced in the extension element 9. There is no plugging element as in FIG. 8C1 and the filling is radially made. An aperture 75 is provided in the outer conductor 71 at the housing 7 and a lid 76 is provided to close it. Of course, several housings could be arranged in an annular way in the extension element, and an aperture opening into each of the housings would be provided in the outer conductor, each of the apertures would cooperate with a lid to seal it.

Alternatively, the guided wave device can be a waveguide rather than a transmission line. The principle on which the present invention relies remains valid for waveguides although their operation cannot be described by the line theory.

In FIG. 8D, the electromagnetic field exposure device is formed by a rectangular waveguide section 80 constructed about a longitudinal axis XX'. The axis XX' is oriented vertically in FIG. 8D. It should be recalled that a rectangular waveguide is a rectangular cross-section metal tube, this metal tube is thus a hollow tubular electrical conductor and the electric field is established inside the space delimited by this hollow tubular electrical conductor. The heterogeneous matching structure 6 takes the form of a parallelepiped block inserted in the waveguide section 80 and in mechanical contact with the inner wall 81 of the metal tube. It fits the internal shape of the rectangular waveguide 80.

The block forms the extension element 9 and is equipped with a blind hole 7 which forms the housing for the object 8. In FIG. 8D, the propagation of the electromagnetic field is substantially vertical, and the blind hole 7 is placed at a downstream end of the heterogeneous matching structure 6. With this configuration, it is possible that the object 8 is liquid and a plug for closing the housing is not absolutely necessary. It is assumed that the side outer walls of the extension element 9 are metallized to improve contact with the inner wall of the rectangular waveguide section 80.

In FIG. 8E, the electromagnetic field exposure device is formed by a circular waveguide section 90 constructed about a longitudinal axis XX'. The axis XX' is vertically oriented in FIG. 8E. It should be recalled that a circular waveguide is a circular cross-section metal tube, this metal tube is thus a hollow electrical conductor and the electric field is established inside the space delimited by this hollow tubular electrical conductor. The heterogeneous matching structure 6 takes the form of a cylindrical block with the axis XX', inserted in the circular waveguide section 90 and in mechanical contact with the inner wall of the metal tube. It fits the internal shape of the circular waveguide 90. It is coaxial with it. The block forms the extension element 9 and is equipped with a blind hole 7 which forms the housing for the object. In FIG. 8E, the propagation of the electromagnetic field is substantially vertical, and the blind hole 7 is placed at a downstream end of the heterogeneous matching structure 6. With this configuration, it is possible that the object is liquid and a plug for closing the housing is not absolutely necessary. One or more blind hole-shaped housings would also be suitable with the electromagnetic field exposure device formed by a coaxial transmission line section as the one of FIGS. 8C1, 8C2.

In these two figures, it is preferable that the waveguides are formed by two dismountable and re-assemblable segments. The boundary between both could be located at the mouth of the blind hole 7. Of course, other positions can be contemplatable. The blind hole 7 can thus be readily filled and emptied. In FIG. 8D, the two segments bear the references 80.1 and 80.2 and in FIG. 8E, the two segments bear the references 90.1 and 90.2. The segments can be joined end-to-end by screwing on external broadenings. Many other solutions are however possible.

It can also be contemplated that the housings open sidewise or radially into the outer wall of the waveguides regardless of whether they are respectively rectangular or circular.

In all the examples of FIG. 8, the heterogeneous matching structure has of course the previously set out length characteristic and the extension element has the previously set out relative dielectric permittivity.

It is set out that it is attempted to fill at best the housing with the object to avoid the presence of air in the housing.

The positioning of the object in the heterogeneous matching structure is made as a function of the axial variation in the amplitude of the electric field which is established in the heterogeneous matching structure. There are optimum positions in terms of homogeneity and level of the electric field for the object(s), they are located, along the heterogeneous matching structure, at multiples of the half-wavelength of the electromagnetic wave to be propagated in the electromagnetic field exposure device.

Although several embodiments of the present invention have been represented and described in detail, it will be understood that different changes and modifications can be made without departing from the scope of the invention.

REFERENCES CITED

[1] French patent application deposited on 28 May 2014 under registration number 14 54 821;

[2] A. Paffi et al., Exposure systems for bioelectromagnetic investigations in the radiofrequency range: classification and emerging trends, Proceedings of EuCAP 2011, pages 3159-3163;

[3] A. Paffi et al., Review of radiofrequency exposure systems for in vitro biological experiments, Proceedings of EuCAP 2010, Barcelona, 12-16 Apr. 2010;

[4] A. Paffi et al., Considerations for developing an RF exposure system: a review for in vitro biological experiments, IEEE Transactions on microwave theory and techniques, vol. 58, N° 10, October 2010, pages 2702-2714;

[5] N. Kuster et al., Recommended minimal requirements and development guidelines for exposure setups of bio-experiments addressing the health risk concern of wireless communications, Bioelectromagnetics, N° ° 21, pages 508-514, 2000;

[6] M. Liberti et al, A coplanar-waveguide system for cells exposure during electrophysiological recordings, IEEE Transactions on microwave theory and techniques, vol. 52, N° 11, October 2004, pages 2251-2258;

[7] J. X. Zhao et al, Dosimetry and temperature evaluations of a 1800 MHz TEM cell for in vitro exposure with standing waves, Progress in electromagnetics research, vol. 124, pages 487-510, 2012;

[8] C. Iftode et al, Design and validation of a TEM cell used for radiofrequency dosimetric studies, Progress in electromagnetics research, vol. 132, pages 369-388, 2012;

[9] S. Kohler et al, Characterization of a TEM cell-based setup for the exposure of biological cell suspensions to high-intensity nanosecond pulsed electric fields (nsPEFs), IEEE 2012;

[10] Y-H Wu et al, Moveable wire electrode microchamber for nanosecond pulsed electric-field delivery, IEEE Transactions on biomedical engineering, vol. 60, N° 2, February 2013, pages 489-496;

[11] P. Krishnaswamy et al, Compact high voltage subnanosecond pulsed power delivery system for biological applications, 16$^{th}$ IEEE International conference on pulsed power, 2007, pages 476-480;

[12] French patent application published under number 2 998 813.

The invention claimed is:

1. An exposure device for exposing at least one object to an electromagnetic field, the exposure device comprising:
    a guided electromagnetic wave device section of a waveguide-type or a transmission line-type, in which an electromagnetic wave will propagate, extending along a longitudinal axis which is an axis of propagation of the electromagnetic wave, and including a hollow tubular electrical conductor inside which the electromagnetic wave is established or plural electrical conductors between which the electromagnetic wave is established; and
    a heterogeneous matching structure in mechanical contact with the electrical conductor(s), the heterogeneous matching structure including at least one extension element and at least one hollow housing for accommodating each object, the hollow housing being arranged in or juxtaposed to the extension element,
    wherein the extension element is made from a material having a relative dielectric permittivity comprised between 0.5 and 1.5 times a relative dielectric permittivity of each object, and
    wherein the heterogeneous matching structure has a dimension, along the longitudinal axis, equal to a non-zero multiple of half-wavelengths of the electromagnetic wave to be propagated in the exposure device.

2. The exposure device according to claim 1, comprising a waveguide section in which the heterogeneous matching structure fits an internal shape of the waveguide.

3. The exposure device according to claim 2, comprising a waveguide section split into two connectable segments or by a coaxial transmission line section including a tubular outer conductor and a center conductor split into two connectable segments.

4. The exposure device according to claim 1, wherein the material of the extension element has an equivalent electrical conductivity comprised between 0.7 and 1.3 times an equivalent electrical conductivity of the object.

5. The exposure device according to claim 1, comprising a two-wire line section including two parallel conductors, wherein the heterogeneous matching structure extends longitudinally between both conductors and includes one extension element and one hollow housing juxtaposed to the extension element.

6. The exposure device according to claim 1, comprising a triplate line section with a center conductor placed between two conductors facing each other, a first space and a second space being provided between each of the two conductors facing each other and the center conductor, the heterogeneous matching structure being subdivided into two half-structures, each of the two half-structures being placed in one of the first space and the second space.

7. The exposure device according to claim 1, comprising a transmission line section including a substrate of dielectric material, the heterogeneous matching structure being housed in a cavity of the substrate or in a through hole of the substrate.

8. The exposure device according to claim 1, comprising a line section coaxial with a center conductor and an outer conductor surrounding the center conductor and dielectric material between the center conductor and the outer conductor, wherein the heterogeneous matching structure is in a place of a dielectric material section separating the center conductor and the outer conductor of the coaxial line.

9. The exposure device according to claim 1, comprising a coplanar line section including three parallel conductors, the heterogeneous matching structure being subdivided into two heterogeneous matching half-structures each extending longitudinally between two different conductors and each including an extension element of dielectric material and one or more hollow housings cooperating with the extension element.

10. The exposure according to claim 1, comprising plural hollow housings located along the heterogeneous matching structure in multiple positions of the half-wavelength of the electromagnetic wave to be propagated in the exposure device.

11. The exposure device according to claim 1, wherein the hollow housing is, on a first side, adjoining the extension element and on a second side, is bordered by a plugging element of dielectric material, the plugging element being bordered opposite the hollow housing by a dielectric material, the plugging element being excluded from the heterogeneous matching structure insofar as it is made from a material having a relative dielectric permittivity comprised between 0.5 and 1.5 times a relative dielectric permittivity of the dielectric material that borders it.

12. The exposure device according to claim 1, comprising a hollow housing arranged between two segments of the extension element.

13. The exposure device according to claim 1, comprising a hollow housing arranged in the extension element.

14. The exposure device according to claim 1, comprising a hollow housing subdivided into plural hollow compartments, each hollow compartment being configured to accommodate a corresponding object.

15. The exposure device according to claim 1, comprising a removable part comprising a first transmission line section provided with the heterogeneous matching structure and an accommodating part, including a second transmission line section and a third transmission line section, for being placed on a microscope stage, in a working position, the first transmission line section being connected on a first side to the second transmission line section and on a second side to the third transmission line section.

16. A method for testing at least one object having a relative dielectric permittivity, the method comprising:
    providing a guided electromagnetic wave device section of a waveguide-type or a transmission line-type in which an electromagnetic wave will propagate, extending along a longitudinal axis which is an axis of propagation of the electromagnetic wave, and including a hollow tubular electrical conductor inside which the electromagnetic wave is established or plural electrical conductors between which the electromagnetic wave is established, and a heterogeneous matching structure in mechanical contact with the electrical conductor(s), the heterogeneous matching structure including at least one extension element and at least one hollow housing arranged in or juxtaposed to the extension element, the extension element being made from a material having a relative dielectric permittivity comprised between 0.5 and 1.5 times a relative dielectric permittivity of each object, and the heterogeneous matching structure having a dimension, along the longitudinal axis, equal to a non-zero multiple of half-wavelengths of the electromagnetic wave to be propagated in the guided electromagnetic wave device section;

placing each object in the corresponding hollow housing; and propagating the electromagnetic wave in the guided electromagnetic wave device section.

* * * * *